United States Patent
Ninoyu et al.

(10) Patent No.: US 9,783,170 B2
(45) Date of Patent: Oct. 10, 2017

(54) VEHICLE CONTROL APPARATUS

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Masaki Ninoyu, Obu (JP); Takahiro Okano, Chiryu (JP); Daisuke Nakata, Seto (JP); Yuusuke Kamiya, Okazaki (JP); Masaaki Komazawa, Miyoshi (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 210 days.

(21) Appl. No.: 14/681,774

(22) Filed: Apr. 8, 2015

(65) Prior Publication Data

US 2015/0291136 A1    Oct. 15, 2015

(30) Foreign Application Priority Data

Apr. 9, 2014  (JP) .................................. 2014-080476

(51) Int. Cl.
  *G06F 7/70*     (2006.01)
  *G06F 19/00*    (2011.01)
  (Continued)

(52) U.S. Cl.
  CPC . *B60T 8/17* (2013.01); *B60T 8/36* (2013.01); *B60T 13/686* (2013.01); *G01S 19/19* (2013.01)

(58) Field of Classification Search
  CPC .......... G01S 19/19; B60T 13/686; B60T 8/36; B60T 8/17
  (Continued)

(56) References Cited

U.S. PATENT DOCUMENTS

2012/0285555 A1* 11/2012 Shimono ................... B60T 8/36
                                             137/487.5
2013/0221736 A1*  8/2013 Kuki ..................... B60T 13/686
                                               303/20

FOREIGN PATENT DOCUMENTS

JP         10-278764 A     10/1998
JP       2005-035466 A      2/2005
(Continued)

OTHER PUBLICATIONS

Office Action dated Sep. 20, 2016, by the Japanese Patent Office in corresponding Japanese Patent Application No. 2014-080476. (3 pgs).

*Primary Examiner* — Mahmoud Ismail
(74) *Attorney, Agent, or Firm* — Buchanan, Ingersoll & Rooney PC

(57) ABSTRACT

The vehicle control apparatus gives a control current to the electromagnetic control valve at a start of energization of the electromagnetic control valve as a start current value smaller by a first determined amount than an open/closed state change-over reference current value which is necessary for changing over a state of the electromagnetic valve and after the start of energization of the electromagnetic control valve, the control current gradually increases with a smaller increase inclination than an increase inclination of an increase control of the control current which gives priority to a control responsibility of the electromagnetic control valve and finishes a gradual increase of the control current applying to the electromagnetic control valve, when the control current exceeds a finish current value which is larger than the open/closed state change-over reference current value.

8 Claims, 8 Drawing Sheets

(51) Int. Cl.
*G06G 7/00* (2006.01)
*G06G 7/76* (2006.01)
*B60T 8/17* (2006.01)
*F16K 31/12* (2006.01)
*F16K 31/36* (2006.01)
*B60T 13/00* (2006.01)
*B60T 15/14* (2006.01)
*G01S 19/19* (2010.01)
*B60T 13/68* (2006.01)
*B60T 8/36* (2006.01)

(58) Field of Classification Search
USPC .................. 701/482, 70; 137/487.5; 303/20
See application file for complete search history.

(56) References Cited

FOREIGN PATENT DOCUMENTS

| | | |
|---|---|---|
| JP | 2006017181 A | 1/2006 |
| JP | 2010-042702 A | 2/2010 |
| JP | 2012236460 A | 12/2012 |
| JP | 2013180580 A | 9/2013 |

* cited by examiner

Cylinder Opening Side ⟵⟶ Cylinder Bottom Surface Side

VEHICLE CONTROL APPARATUS

This application claims priority under 35 U.S.C. 119 with respect to Japanese Application No. 2014-080476 filed in Japan on Apr. 9, 2014, the entire content of which is herein incorporated by reference.

BACKGROUND OF THE INVENTION

Technical Field

This invention relates to a vehicle control apparatus.

Background Art

Conventionally, as one type of a brake control device, a vehicle brake control device disclosed in a Patent Literature 1 is known. As shown in FIG. 3 of the Patent Literature 1, the brake control device includes an electromagnetic control valve provided in a hydraulic pressure circuit for controlling a braking force applied to a vehicle and a control portion connected to a detecting system to be receivable of outputs from the detecting system for opening or closing the electromagnetic control valve by outputting a control current according to a first current profile which can guarantee that the electromagnetic control valve can be opened and closed with a required control responsibility. The control portion judges based on the output from the detecting system whether the drop of control responsibility of the electromagnetic control valve can be acceptable or not. When the control portion judges that the drop of the control responsibility is acceptable, the control portion outputs a control current to the electromagnetic control valve based on a second current profile which is adjusted to more reduce the operation noise of the electromagnetic control valve than the control current of the first current profile. (See FIG. 5 of the Patent Literature 1).

In FIG. 2 of the Patent Literature 1, a profile Q1 is disclosed as an example of a current profile for reducing the operation noise. The profile is set to infuse an annealing current "Aa" when a braking starts so as to increase the control current to the target activating current "Az" taking an annealing time T2 from the start of the braking. After the time T2, the supply of the target activating current "Az" continues. This annealing time T2 is set to be longer than an opening/closing operation completion time T1 of the current profile for normal control operation. Therefore, a current inclination at the actual activating current "At" can be lessened to thereby reduce the opening/closing operation noise.

CITATION LIST

Patent Literature

Patent Literature 1: JP2010-42702 A

SUMMARY OF INVENTION

However, in the above conventional brake control device, the reduction of the opening/closing operation noise (hammering noise) of the electromagnetic control valve can be achieved by lessening the current inclination of the actual activating current At. However, the actual activating current At may be deviated due to a differential pressure of the electromagnetic control valve at the starting time of braking (at the current energization start time) This may raise a problem that a sufficient reduction of the opening/closing noise cannot be achieved.

Accordingly, this invention was made in consideration with the above-mentioned situation and the objective of the invention is to provide a vehicle control apparatus which can surely reduce the opening/closing operation noise without receiving an influence of the deviation of the differential pressure of the electromagnetic control valve.

Solution to Problem(s)

The vehicle control apparatus according to the invention associated with claim 1 to solve the problems above is characterized in that the vehicle control apparatus is applied to a vehicle brake device equipped with an electromagnetic control valve provided in a hydraulic pressure circuit for controlling a braking force to be applied to a vehicle, the electromagnetic control valve being either a normally open electromagnetic valve which becomes an open state when de-energized or a normally closed electromagnetic valve which becomes a closed state when de-energized, wherein the vehicle control apparatus controls the electromagnetic control valve to open or close by applying a control current thereto. The vehicle control apparatus applies the control current of a start current value to the electromagnetic control valve at a start of energization of the electromagnetic control valve. The start current value is smaller by a first predetermined amount than an open/closed state change-over reference current value which is necessary for changing over a state of the normally open electromagnetic valve from the open state to a closed state or for changing over a state of the normally closed electromagnetic valve from the closed state to an open state and which is also set based on a magnitude of a differential pressure between an inlet port and an outlet port of the electromagnetic control valve. Thereafter, the vehicle control apparatus gradually increases the control current with a smaller increase inclination than an increase inclination of an increase control of the control current which gives priority to a control responsibility of the electromagnetic control valve. When the control current exceeds a finish current value which is larger than the open/closed state change-over reference current value, the vehicle control apparatus finishes the gradual increase of the control current.

According to the above feature of the invention, since the open/closed state change-over reference current value is set based on the differential pressure between the inlet and outlet ports of the electromagnetic control valve, even when the differential pressure is changed, the open/closed state change-over reference current value can be also changed appropriately in accordance with the change of the differential pressure. Thus, the start current value and the finish current value of the control current applied to the electromagnetic control valve can be appropriately set. In other words, when the electromagnetic control valve is a normally open type electromagnetic valve, the state of the normally open electromagnetic valve is surely changed from the open to the closed state in the vicinity of the open/closed state change-over reference current value during the gradual increase control of the control current to the electromagnetic control valve. On the other hand, when the electromagnetic control valve is a normally closed type electromagnetic valve, the state of the normally closed electromagnetic valve is surely changed from the closed to the open state in the vicinity of the open/closed state change-over reference current value during the gradual increase control of the control current applied to the electromagnetic control valve. Thus, the control current appropriately corresponding to the change of the differential pressure can be applied to the electromagnetic control valve. As the result, the open/close operation noise can be surely reduced without receiving any influence from the change of the differential pressure of the electromagnetic control valve.

A second aspect of the invention is characterized in that in addition to the feature of the first aspect, the vehicle control apparatus controls the control current so that a change speed of the control current from the start current value to the finish current value becomes high as a change speed of the differential pressure becomes high. Therefore, the change speed of the control current from the start current value to the finish current value can be appropriately set in accordance with the change speed of the differential pressure during a gradual increase of the control current to the electromagnetic control valve. Thus, when the electromagnetic control valve is a normally open type electromagnetic valve, the state of the normally open electromagnetic valve is surely changed from the open to the closed state in the vicinity of the open/closed state change-over reference current value during the gradual increase control of the control current to the electromagnetic control valve. On the other hand, when the electromagnetic control valve is a normally closed type electromagnetic valve, the state of the normally closed electromagnetic valve is surely changed from the closed to the open state in the vicinity of the open/closed state change-over reference current value during the gradual increase control of the control current to the electromagnetic control valve.

The invention according to claim 3 is characterized in that in addition to the feature of the above claim 1, the vehicle control apparatus changes the first predetermined amount in accordance with the change speed of the differential pressure. Thus, the greater the change speed of the differential pressure, the smaller the value of the first predetermined amount can be net and accordingly, the start current value at the start of energization of the electromagnetic control valve can be approximated to the open/closed state change-over reference current value. Accordingly, when the change speed of the differential pressure is large, the normally open type electromagnetic valve can be quickly and surely changed over from the open state to the closed state in the vicinity of the open/closed state change-over reference current value during the gradual increase of the control current to the electromagnetic control valve and the normally closed type electromagnetic valve can be quickly and surely changed over from the closed state to the open state in the vicinity of the open/closed state change-over reference current value during the gradual increase of the control current to the electromagnetic control valve.

A fourth aspect of the invention is characterized in that in addition to the feature of any one of the first through third aspects, the vehicle brake device includes a master cylinder wherein a master pressure in a master chamber is variable in accordance with a movement of a master piston which is driven to move by a servo pressure in a servo chamber and a servo pressure generating device which includes a high pressure source, a pressure increase control valve provided between the high pressure source and the servo chamber for controlling a flow of brake fluid from the high pressure source to the servo chamber, a low pressure source and a pressure decrease control valve provided between the low pressure source and the servo chamber for controlling the flow of the brake fluid from the servo chamber to the low pressure source thereby to generate the servo pressure in the servo chamber, wherein the electromagnetic control valve is the pressure decrease control valve. A hammering noise may be generated when the pressure decrease control valve used in the vehicle brake device equipped with a servo pressure generating device is changed over from the open state to the closed state or vice versa. According to the invention, such noise can be effectively minimized.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

EMBODIMENTS FOR IMPLEMENTING INVENTION

Figure 1:
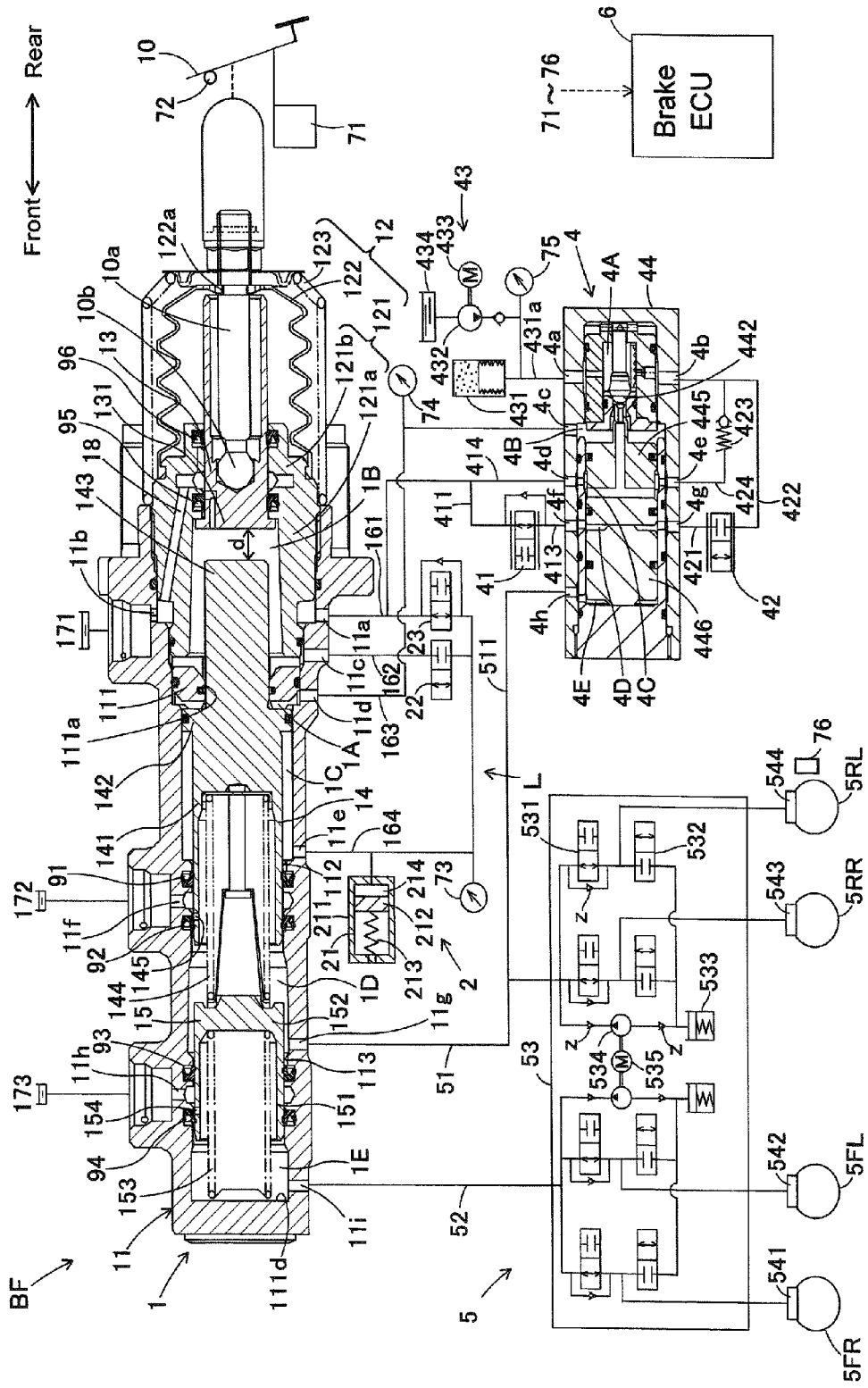
FIG. 1 is a view explaining the general structure of the vehicle brake device according to an embodiment of the invention.

The vehicle control apparatus and the vehicle brake device which is controllable by the vehicle control apparatus according to the embodiment of the invention will be explained hereinafter with reference to the attached drawings. The shape and the size of each component in the drawings, by which the structural explanation thereof will be made, are not necessarily accurate to the actual product.

As shown in FIG. 1, the vehicle brake device is formed by a hydraulic pressure braking force generating device BF which generates the hydraulic pressure braking force at the vehicle wheels 5FR, 5FL, 5RR and 5RL and a brake ECU 6 (corresponding to the vehicle control apparatus) which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, a servo pressure generating device 4, a hydraulic pressure control portion 5 and various sensors 71 through 76.

(Master Cylinder 1)

The master cylinder 1 is a portion which supplies the hydraulic pressure control portion 5 with the brake fluid in response to the operating amount (operation) of a brake pedal 10 (corresponding to the brake operating member) and is formed mainly by a main cylinder 11, a cover cylinder 12, an input piston 13, a first master piston 14 and a second master piston 15. The master cylinder 1 changes a master pressure in a first master chamber 1D by the movement of the first master piston 14 which is to move driven by a servo pressure in a servo chamber 1A. It is noted that the first master piston 14 corresponds to a master piston (defined in the claims) which generates a master cylinder hydraulic pressure in response to the servo pressure by slidably moving within the master cylinder 1.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be somewhat smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side the opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the flange portion 142 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A". A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. "A second master chamber 1E" is defined by the inner peripheral surface and the inner bottom surface 111d of the main cylinder 11 and the pressurizing cylindrical portion 151 of the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11m and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the inner wall portion 111 and at the same time forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91, 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95, 96 are provided between the input piston 13 and the cylindrical portion 121.

The stroke sensor 71 is a sensor which detects the operating amount (a pedal stroke) of the operation of the brake pedal 10 by a driver (operator) of the vehicle and transmits the detected result to the brake ECU 6. A brake stop switch 72 is a switch which detects whether the brake pedal 10 is depressed or not using a binary signal (ON & OFF) and the detected result is sent to the brake ECU 6. It may be possible to use an operating force sensor which detects an operating force (depression force) in response to the operation of the brake pedal 10 by the operator, instead of using the stroke sensor 71.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location backward of the piston 212, which is biased in the backward direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

A hydraulic pressure circuit L is formed by the first hydraulic pressure chamber 1B, the second hydraulic pressure chamber 1C, the reaction force hydraulic pressure chamber 214 and the conduits 162 and 164 when the first control valve 22 is in an open state and the second control valve 23 is in a closed state. When the input piston 13 is slightly advanced by the operation of the brake pedal 10, the fluid communication between the first hydraulic pressure chamber 1B and the passage 18 is interrupted and since the fluid communication of the second hydraulic pressure chamber 1C which is in fluid communication with the hydraulic pressure circuit L has been interrupted with parts other than the hydraulic pressure circuit L, the hydraulic pressure circuit L becomes in a closed state. When the input piston 13 is further advanced, the brake fluid corresponding to the stroke of the input piston 13 flows into the reaction force hydraulic pressure chamber 214 from the first and the second hydraulic pressure chambers 1B and 1C by overcoming the reaction force of the compression spring 213. Thus, the input piston 13 strokes according to the operation of the brake pedal 10 and at the same time a hydraulic pressure according to the stroke is generated in the hydraulic pressure circuit L as a reaction force hydraulic pressure by the reaction force of the compression spring 213. This reaction force hydraulic pressure is transmitted to the brake pedal 10 from the input piston 13 through the operating rod 10a and is transmitted to the driver of the vehicle as a brake reaction force in response to the reaction force of the compression spring 123 which biases the operating rod 10a.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state and under this state communication between the first hydraulic pressure chamber 1B and the second hydraulic pressure chamber 1C is interrupted. Due to the closure of the first hydraulic pressure chamber 1B, the brake fluid is nowhere to flow and the input piston 13 and the first master piston 14 are moved integrally keeping the separation distance "d" therebetween to be constant. The first control valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the brake fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state. On the other hand, while the first control valve 22 is in an open state, the pressure sensor 73 also detects the pressure (or the reaction force hydraulic pressure) in the hydraulically connected first hydraulic pressure chamber 1B. The pressure sensor 73 sends the detected signal to the brake ECU 6.

(Second Control Valve 23)

The second control valve 23 is an electromagnetic valve which is structured to open under a non-energized state and is configured so that the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Pressure Generating Device 4)

The servo pressure generating device 4 is a device which generates a servo pressure and includes a pressure decreasing valve 41 (corresponding to the pressure decrease control valve), a pressure increasing valve 42 (corresponding to the pressure increase control valve), a high pressure supplying portion 43 (corresponding to the high pressure source) a reservoir 171 (corresponding to the low pressure source) a regulator 44 and so on. The servo pressure generating device 4 generates the servo pressure in the servo chamber 1A corresponding to the operation of the brake pedal 10 by the driver (operator) of the vehicle.

The pressure decreasing valve 41 is an electromagnetic valve which opens when the valve is not energized (i.e., a normally-open-type electromagnetic valve which opens under a non-energized state: electromagnetic control valve) and flow-rate therethrough is controlled by the brake ECU 6. The pressure decreasing valve 41 is a valve which controls linearly the differential pressure between the upper stream side and the downstream side of the valve and one port of the pressure decreasing valve 41 is connected to the conduit 161 via a conduit 411 and the other port of the pressure decreasing valve 41 is connected to a conduit 413. More specifically, the one port of the pressure decreasing valve 41 is in communication with the reservoir 171 (corresponding to the low pressure source) via the conduits 411, 161, and ports 11m, 11b. Thus, the pressure decreasing valve 41 is a pressure decrease control valve which is disposed between the reservoir 171 and the servo chamber 1A for controlling the flow of the brake fluid from the servo chamber 1A to the reservoir 171.

The pressure increasing valve 42 is a valve which closes under a non-energized state (i.e., a normally closed electromagnetic valve which closes under the non-energized state: electromagnetic control valve). The flow-rate of the pressure increasing valve 42 is controlled by the brake ECU 6. The pressure increasing valve 42 is a valve which controls linearly the differential pressure between upper stream side and downstream side of the valve and one port of the pressure increasing valve 42 is connected to the conduit 421 and the other port of the pressure increasing valve 42 is connected to a conduit 422. Thus, the pressure increasing valve 42 is a pressure increasing control valve which is disposed between the high pressure supplying portion 43 and the servo chamber 1A for controlling the flow of the brake fluid from the high pressure supplying portion 43 to the servo chamber 1A. Both pressure decreasing and increasing valves 41 and 42 form a pilot hydraulic pressure generating device.

The high pressure supplying portion 43 is a portion for supplying the regulator 44 with a highly pressurized brake fluid. The high pressure supplying portion 43 includes an accumulator 431, a hydraulic pressure pump 432, a motor 433 and a reservoir 434 and so on. The reservoir 171 is kept under the atmospheric pressure and the pressure therein is lower than the pressure in the high pressure supplying portion 43.

The accumulator 431 is a tank in which a highly pressurized brake fluid is accumulated and is connected to the regulator 44 and the hydraulic pressure pump 432 via a conduit 431*a*. The hydraulic pressure pump 432 is driven by the motor 433 and supplies the pressurized brake fluid to the accumulator 431, the brake fluid being accumulated in the reservoir 434. The pressure sensor 75 provided in the conduit 431*a* detects the accumulator hydraulic pressure in the accumulator 431 and the detected signal is sent to the brake ECU 6. The accumulator hydraulic pressure correlates with the accumulated brake fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the pressurized brake fluid to the accumulator 431 in order to recover a pressure up to the value equal to or more than the predetermined value.

Figure 2:
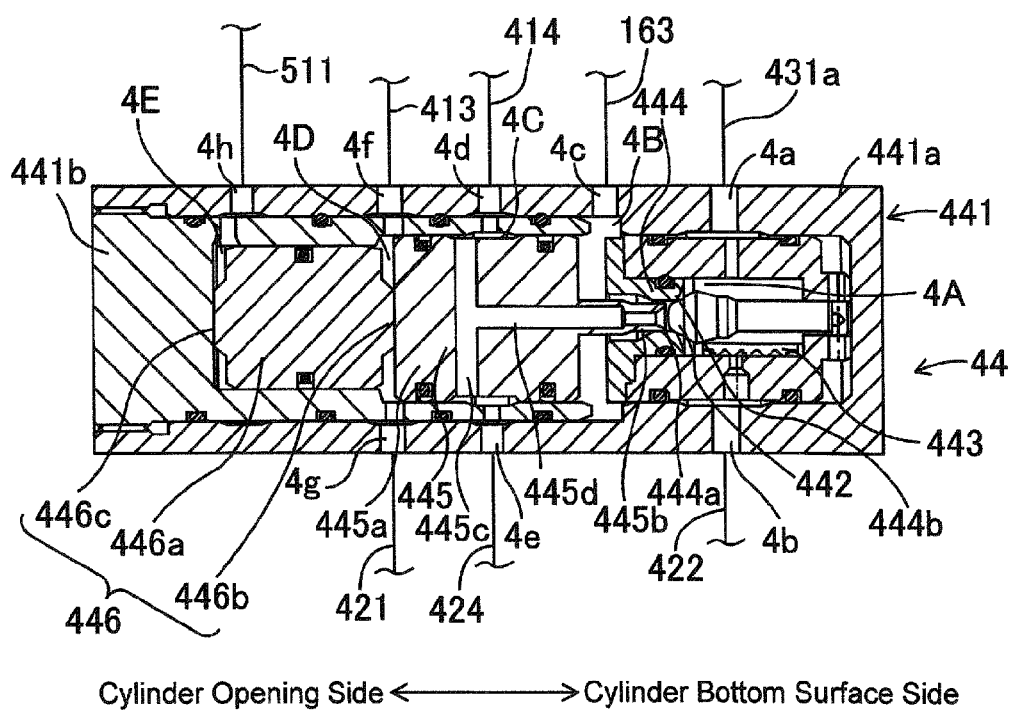
FIG. 2 is a cross sectional view of a regulator showing a detail structure thereof according to the embodiment.

FIG. 2 is a partial cross sectional view illustrating a configuration of the inside of the mechanical regulator 44 forming the servo pressure generating device 4. As shown in the drawing, the regulator 44 includes a cylinder 441, a ball valve 442, a biasing portion 443, a valve seat portion 444, a control piston 445, a sub-piston 446 and so forth.

The cylinder 441 includes a cylinder case 441*a* formed in a substantially bottomed cylinder-shape having a bottom surface at one and thereof (at the right side in FIG. 2) and a cover member 441*b* closing an opening of the cylinder case 441*a* (at the left side thereof in FIG. 2). The cylinder case 441*a* is provided with a plurality of ports 4*a* through 4*h* through which the inside and the outside of the cylinder case 441*a* are in communication. The cover member 441*b* is formed to be in a substantially bottomed cylinder-shape and a plurality of ports is provided at each portion on the cylindrical portion facing to the corresponding ports 4*d* through 4*h* of the cylinder case 441*a*.

The port 4*a* is connected to the conduit 431*a*. The port 4*b* is connected to the conduit 422. The port 4*c* is connected to a conduit 163. The conduit 163 connects the servo chamber 1A and the outlet port 4*c*. The port 4*d* is connected to the conduit 161 via the conduit 414. The port 4*e* is connected to the conduit 424 and further connected to the conduit 422 via a relief valve 423. The port 4*f* is connected to the conduit 413. The port 4*g* is connected to the conduit 421. The port 4*h* is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441*a* inside of the cylinder 441. The biasing portion 443 is formed by a spring member biasing the ball valve 442 towards the opening side (which will be hereinafter referred to also as a cylinder opening side) of the cylinder case 441*a*, and is provided at the bottom surface of the cylinder case 441*a*. The valve seat portion 444 is a wall member provided at the inner peripheral surface of the cylinder case 441*a* and divides the cylinder into the cylinder opening side and the cylinder bottom surface side. A through passage 444*a* through which the divided cylinder opening side and the cylinder bottom surface side are in communication is formed at a center of the valve seat portion 444. The valve seat portion 444 supports the ball valve 442 from the cylinder opening side by closing the through passage 444*a* by the biased ball valve 442. A valve seat surface 444*b* is formed at the opening portion of the cylinder bottom surface side of the through passage 444*a* such that the ball valve 442 is separated from or seated on (brought into contact with) a valve seat surface 444*b*.

A space defined by the ball valve 442, the valve seat portion 444 and the inner circumferential surface of the cylinder case 441*a* at the cylinder bottom surface side is referred to as "a first chamber 4A". The first chamber 4A is filled with the brake fluid and is connected to the conduit 431*a* via the port 4*a* and to the conduit 422 via the port 4*b*.

The control piston 445 includes a main body portion 445*a* formed in a substantially columnar shape and a projection portion 445*b* formed in a substantially columnar shape having a smaller diameter than the main body portion 445*a*. The main body portion 445*a* is arranged in the cylinder 441 in a coaxial and liquid-tight manner on the cylinder opening side of the valve seat portion 444, the main body portion 445*a* being slidably movable in the axial direction. The main body portion 445*a* is biased towards the cylinder opening side by means of a biasing member (not shown). A passage 445*c* is formed at a substantially intermediate portion of the main body portion 445*a* in a cylinder axis direction. The passage 445*c* extends in the radial direction (in an up-and-down direction as viewed in FIG. 2) and both end portions thereof open at a circumferential surface of the main body portion 445*a*. A portion of an inner circumferential surface of the cylinder 441 corresponding to an opening position of the passage 445*c* is provided with the port 4*d* and is formed to be recessed, which recessed space portion forms a "third chamber 4C".

The projection portion 445*b* projects towards the cylinder bottom surface side from a center portion of an end surface of the cylinder bottom surface side of the main body portion 445*a*. The projection portion 445*b* is formed so that the diameter thereof is smaller than the diameter of the through passage 444*a* of the valve seat portion 444. The projection portion 445*b* is coaxially provided relative to the through passage 444*a*. A tip end of the projection portion 445*b* is spaced apart from the ball valve 442 towards the cylinder opening side by a predetermined distance. A passage 445*d* is formed at the projection portion 445*b* so that the passage 445*d* extends in the cylinder axis direction and opens at a center portion of an end surface of the projection portion 445*b*. The passage 445*d* extends up to the inside of the main body portion 445*a* and is connected to the passage 445*c*.

A space defined by the end surface of the cylinder bottom surface side of the main body portion 445*a*, an outer surface of the projection portion 445*b*, the inner circumferential surface of the cylinder 441, the valve seat portion 444 and the ball valve 442 is referred to as a "second chamber 4B". The second chamber 4B is in communication with the ports 4*d* and 4*e* via the passages 445*d* and 445*c* and the third chamber 4C.

The sub-piston 446 includes a sub main body portion 446*a*, a first projection portion 446*b* and a second projection portion 446*c*. The sub main body portion 446*a* is formed in a substantially columnar shape. The sub main body portion 446*a* is arranged within the cylinder 441 in a coaxial and liquid-tight manner on the cylinder opening side of the main body portion 445*a* the sub main body portion 446*a* being slidably movable in the axial direction.

The first projection portion 446*b* is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the brake fluid. The pressure sensor 74 is a sensor (corresponding to the servo pressure sensor) that detects the servo pressure to be supplied to the servo chamber 1A and is connected to the conduit 163 as shown in FIG. 1. The pressure sensor 74 sends the detected signal to the brake ECU 6.

(Brake Actuator 53)

The first master chamber 1D and the second master chamber 1E which generate the master cylinder hydraulic pressure (master pressure) are in communication with the wheel cylinders 541 through 544 via the conduits 51, 52 and the brake actuator 53. Each wheel cylinder 541 through 544 applies the braking force corresponding to the master pressure from the master cylinder 1 to each corresponding vehicle wheel 5FR through 5RL. The wheel cylinders 541 through 544 are respectively a part of a brake device for the vehicle wheels 5FR through 5RL. In detail, the port 11g of the first master chamber 1D and the port 11i of the second master chamber 1E are respectively connected to a known brake actuator 53 via the conduits 51 and 52, respectively. The brake actuator 53 is connected to the wheel cylinders 541 through 544 which applies braking force to the vehicle wheels 5FR through 5RL.

It is noted here that regarding to the brake actuator 53, a structure of one (5RL) of the four vehicle wheels will be explained. The explanation for the other three vehicle wheels will be omitted because of the similarity of the structure. The brake actuator 53 includes a holding valve 531, a pressure decreasing valve 532, a reservoir 533, a pump 534 and a motor 535. The holding valve 531 is an electromagnetic valve of a normally open type and the opening and closing operation thereof is controlled by the brake ECU 6. One port of the holding valve is connected to the conduit 51 and the other port is connected to the wheel cylinder 544 and the pressure decreasing valve 532. In other words, the holding valve serves as the input valve for the brake actuator 53.

The pressure decreasing valve 532 is an electromagnetic valve of a normally closed type and the opening and the closing of the valve is controlled by the brake ECU 6. One port of the pressure decreasing valve 532 is connected to the wheel cylinder 544 and the holding valve 531 and the other port is connected to the reservoir 533. When the pressure decreasing valve 532 becomes the open state, the communication between the wheel cylinder 544 and the reservoir 533 is established.

The reservoir 533 reserves therein the brake fluid and is connected to the conduit 51 through the pump 534. The suction port of the pump 534 is connected to the reservoir 533 and discharge port is connected to the conduit 51 via a check valve "z". The check valve "z" allows the flow of fluid from the pump 534 to the conduit 51 (first master chamber 1D) but restricts the flow of fluid in the opposite direction. The pump 534 is driven by the operation of the motor 535 which is operated based on the instructions from the brake ECU 6. The pump 534 suctions the brake fluid in the wheel cylinder 544 or the brake fluid reserved in the reservoir 533 and returns the suctioned brake fluid to the first master chamber 1D when the ABS operation is under a pressure decreasing mode. It is noted that a damper (not shown) is provided at a down stream side of the pump 534 for damping the pulsation of the brake fluid discharged from the pump 534.

Thus, the brake actuator 53 is connected between the master cylinder 1 and the wheel cylinders 541 through 544 and is structured to make from the master pressure a wheel cylinder pressure which is the target wheel cylinder pressure necessary for a desired braking force at each wheel cylinder 541 through 544 individually by means of the holding valve and the pressure decreasing valve provided corresponding to the respective wheel cylinder 541 through 544.

The brake actuator 53 is provided with a vehicle wheel sensor 76 which detects the vehicle wheel speed of each of the vehicle wheels 5FR, 5FL, 5RR and 5RL. The detection signal which indicates the detected speed of the vehicle wheel by the vehicle wheel speed sensor 76 is outputted to the brake ECU 6. It is noted that only one vehicle wheel speed sensor 76 is shown in FIG. 1, but the sensor 76 is provided at each of the vehicle wheels 5FR, 5FL, 5RR and 5RL.

In the operation of the brake actuator 53, the brake ECU 6 controls each of the holding valves and pressure decreasing valves to open or close and operates the motor when necessary based on the master pressure, vehicle wheel speed state and the front/rearward acceleration and executes an ABS (Anti-Lock Brake Control) control which adjusts the brake hydraulic pressure to be applied to each of the wheel cylinders 541 through 544, i.e., the braking force to be applied to each of the vehicle wheels 5FR, 5FL, 5RR and 5RL. The brake actuator 53 is a device which supplies the wheel cylinders 541 through 544 with the brake fluid adjusted the amount and the supply timing based on the instructions from the brake ECU 6. Further, the brake actuator 53 serves as a function of an actuator for allowing the brake fluid to flow into the master chamber 1D and a function of an actuator for allowing the brake fluid to flow out of the master chamber 1D.

Regarding the operation of the brake actuator 53, even when the brake pedal 10 is not depressed the brake ECU 6 executes the wheel cylinder pressure supplying control in which the target wheel cylinder pressure is individually supplied to each of the wheel cylinders 541 through 544. Such wheel cylinder pressure supplying control includes for example, an ESC control (Electronic Stability Control) and a TRC control (Traction Control). According to the ESC control, when the vehicle is in an unstable condition, such as over-steer or under-steer state, braking force is automatically applied to appropriate wheels or the engine output is automatically controlled to recover the vehicle from the unstable state. In other words, the ESC control is a control for applying a necessary braking force to each of the vehicle wheel(s) which needs proper control in order to prevent the under-steer or the over-steer state of the vehicle even when the driver of the vehicle does not operate the brake pedal 10.

The TRC control is a control for preventing the vehicle wheel from idle rotation at the time of start or at the time of acceleration of the vehicle. For example, under the vehicle starting, if the drive vehicle wheel is idly rotated, the TRC control controls to automatically brake the idly rotating drive wheel or controls automatically the engine output to stop the drive vehicle wheel from idly rotating. Such idly rotating can be detected based on the vehicle speed and the vehicle wheel speed or may be detected based on the vehicle wheel speed of each vehicle wheel.

In the later explained "linear mode" and normal braking, the hydraulic pressure supplied from the accumulator 431 of the servo pressure generating device 4 is controlled by the pressure increasing valve 42 and the pressure decreasing valve 41 to generate the servo pressure in the servo chamber 1A. Then the first and the second master pistons 14 and 15 are advanced to generate the master pressure in the first and the second master chambers 1D and 1E. The master pressure is approximately the same with the servo pressure. The hydraulic pressure in the first and the second master chambers 1D and 1E are supplied to the wheel cylinders 541 through 544 from the ports 11g and 11i via the conduits 51 and 52 and the brake actuator 53 as the master pressure. In other words, the wheel cylinder pressure is approximately the same with the master pressure. Thus the hydraulic pressure braking force is applied to the vehicle wheels 5FR through 5RL corresponding to the wheel cylinder pressure, i.e., corresponding to the servo pressure (Brake ECU 6)

The brake ECU 6 is an electronic control unit and includes a microprocessor. The microprocessor includes an input/output interface, CPU, RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433 and others. The operating amount (pedal stroke) of the brake pedal 10 operated by the operator of the vehicle is inputted to the brake ECU 6 from the stroke sensor 71 and judgment whether the brake pedal 10 operation by the operator of the vehicle is performed or not is inputted to the brake ECU 6 from the brake stop switch 72. Further, the reaction force hydraulic pressure of the second hydraulic pressure chamber 1C or the pressure (or the reaction force hydraulic pressure) of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and the vehicle wheel speed of each vehicle wheel 5FR, 5FL, 5RR and 5RL is inputted to the brake ECU 6 from the vehicle wheel sensor 76. The brake ECU 6 memorizes the two control modes, "linear mode" and "REG mode".

(Linear Mode)

First, the linear mode of the brake ECU 6 will be explained hereinafter. The linear mode is a normal brake controlling mode. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first and the second hydraulic pressure chambers 1B and 1C is established. Thus, in the linear mode, the servo pressure in the servo chamber 1A is controlled by controlling the pressure decreasing valve 41 and the pressure increasing valve 42 under the state that the first control valve 22 is open and the second control valve 23 is closed. In this linear mode, the brake ECU 6 calculates the "required braking force" of the operator of the vehicle based on the brake pedal 10 operating amount (displacement amount of the input piston 13) detected by the stroke sensor 71 or the operating force of the brake pedal 10 by the operator of the vehicle.

In more detail, under the state that the brake pedal 10 is not depressed, the ball valve 442 keeps the through passage 444a of the valve seat 444 to be closed. Further, the pressure decreasing valve 41 is in an open state and the pressure increasing valve 42 is in a closed state under the brake pedal 10 being not depressed. This means that the first chamber 4A and the second chamber 4B are hydraulically separated from each other.

The second chamber 4B is in communication with the servo chamber 1A via the conduit 163 to keep the hydraulic pressure in the two chambers 4B and 1A being mutually in an equal level. The second chamber 4B is in communication with the third chamber 4C via the passages 445c and 445d of the control piston 445 and accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 through the pressure decreasing valve 41. The pressure in the first pilot chamber 4D and the pressure in the second chamber 4B are kept being the equal level. The second pilot chamber 4E is in communication with the first master chamber 1D via the conduits 511 and 51 thereby keeping the pressure level of the two chambers 4E and 1D mutually equal to each other.

Under this state, when the brake pedal 10 is depressed, the brake ECU 6 controls the pressure decreasing valve 41 and the pressure increasing valve 42 based on a target friction braking force (corresponding to the required braking force). In other words, the brake ECU 6 controls the pressure decreasing valve 41 to be closed and controls the pressure increasing valve 42 to be open.

The communication between the accumulator 431 and the first pilot chamber 4D is established by the opening of the pressure increasing valve 42 and the communication between the first pilot chamber 4D and the reservoir 171 is interrupted by the closing of the pressure decreasing valve 41. The pressure in the first pilot chamber 4D can be increased by the highly pressurized brake fluid supplied from the accumulator 431. The control piston 445 is slidably moved towards the cylinder bottom surface side (rear side in FIG. 1) by the increase of the pressure in the first pilot chamber 4D. Thus the tip end of the projection portion 445b of the control piston 445 is brought into contact with the ball valve 442 to close the passage 445d by the ball valve 442 thereby interrupting the communication between the second chamber 4B and the reservoir 171.

Further the control piston 445 slidably moving towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized brake fluid is supplied to the first chamber 4A from the accumulator 431, the hydraulic pressure in the second chamber 4B is also increased by the communication therebetween. As the separation distance between the ball valve 442 and the valve seat surface 444b becomes great, the fluid passage for the brake fluid becomes large and the pressure in the downstream fluid passage of the ball valve 442 becomes high. In other words, the larger the pressure (pilot pressure) in the first pilot chamber 4D, the longer the moving distance of the control piston 445 becomes and accordingly, the separation distance between the ball valve 442 and the valve seat surface 444b becomes large to thereby increase the hydraulic pressure (servo pressure) in the second chamber 4B. It is noted that the brake ECU 6 controls the pressure increasing valve 42 so that the downstream fluid passage of the pressure increasing valve 42 is opened and controls the pressure decreasing valve 41 so that the downstream fluid passage of the pressure decreasing valve 41 is throttled, such that the more the displacement amount (operating amount of the brake pedal 10) of the input piston 13 detected by the stroke sensor 71 becomes, the higher the pilot pressure in the first pilot chamber 4D becomes. In other words, the more the displacement amount (operating amount of the brake pedal 10) of the input piston 13 becomes, the higher the pilot pressure becomes and accordingly the higher the servo pressure becomes as well.

Responding to the increase of the pressure in the second chamber 4B, the pressure in the servo chamber 1A which is in communication with the second chamber 4B increases. By the increase of the pressure in the servo chamber 1A, the first master piston 14 advances and then the pressure in the first master chamber 1D increases. Then, the second master piston 15 also advances and the pressure in the second master chamber 1E increases. By the increase of the pressure in the first master chamber 1D, highly pressurized brake fluid is supplied to the later explained brake actuator 53 and the second pilot chamber 4E. Although the pressure in the second pilot chamber 4E increases, the pressure in the first pilot chamber 4D is also increased and accordingly, the sub piston 446 does not move. Thus, the highly pressurized brake fluid (master pressure) is supplied to the brake actuator 53 and the friction braking operation is performed thereby to apply braking force to the vehicle. The force which advances the first master piston 14 in the "linear mode" corresponds to the servo pressure.

When the braking operation is released, the pressure decreasing valve 41 is opened and the pressure increasing valve 42 is closed to establish the communication between the reservoir 171 and the first pilot chamber 4D. Then the control piston 445 is retreated and the brake pedal 10 returns to the position before the depression operation.

(REG Mode)

The "REG mode" is a mode where the pressure decreasing valve 41, the pressure increasing valve 42, the first control valve 22 and the second control valve 23 are all in non-energized state or becomes non-energized state (maintaining the normal state) due to failure or the like.

Under the "REG mode", the pressure decreasing valve 41, the pressure increasing valve 42, the first control valve 22 and the second control valve 23 are not energized (not controlled state) and accordingly the pressure decreasing valve 41 is in open state, the pressure increasing valve 42 is in closed state, the first control valve 22 is in closed state and the second control valve 23 is in open state. Under this control mode, this non-energized state (not controlled state) is kept even after the brake pedal 10 is depressed.

Under the "REG mode", when the brake pedal 10 is depressed, the input piston 13 advances to shut the passage 18 and fluid communication between the first hydraulic pressure chamber 1B and the reservoir 171 is interrupted. Under this state, since the first control valve 22 is closed, the first hydraulic pressure chamber 1B becomes a closed state (liquid-tightly closed state). However, on the other hand, since the second control valve 23 is in open state, the second hydraulic pressure chamber 1C maintains fluid communication with the reservoir 171

Under this state, when the brake pedal 10 is further depressed, the input piston 13 advances to increase the pressure in the first hydraulic pressure chamber 1B and due to such increase of the pressure, the first master piston 14 advances. Under this state, since the pressure decreasing valve 41 and the pressure increasing valve 42 are not energized, the servo pressure is not in controlled state. In other words, the first master piston 14 advances only by a force (pressure in the first hydraulic pressure chamber 1B) corresponding to the operation force applied on the brake pedal 10 This will increase the volume of the servo chamber 1A. However, since the servo chamber 1A is in fluid communication with the reservoir 171 through the regulator 44, the brake fluid is supplemented thereto.

When the first master piston 14 advances, as similar to the "linear mode", the pressures in the first master chamber 1D and the second master chamber 1E are increased. By this increase of the pressure in the first master chamber 1D, the pressure in the second pilot chamber 4E is increased. By the increase of the pressure in the second pilot chamber 4E, the sub piston 446 slidably moves towards the cylinder bottom surface side. At the same time, the control piston 445 slidably moves towards the cylinder bottom surface side by being pushed by the first projection portion 446b. Thus, the projection portion 445b is brought into contact with the ball valve 442 and the ball valve 442 is pushed and moved towards the cylinder bottom surface side. Accordingly, the fluid communication between the first chamber 4A and the second chamber 4B is established and the fluid communication between the servo chamber 1A and the reservoir 171 is interrupted. Thus, the highly pressurized brake fluid from the accumulator 431 is supplied to the servo chamber 1A.

Under the "REG mode" as explained above, when the brake pedal 10 is depressed with a predetermined stroke by the operating force of the brake pedal 10, the fluid communication between the accumulator 431 and the servo chamber 1A is established to thereby increase the servo pressure without controlling operation and the first master piston 14 advances equal to or more than the operating force by the driver of the vehicle. Therefore, even when each of the electromagnetic valves is under non-energized state, highly pressurized brake fluid is supplied to the brake actuator 53 as long as such highly pressurized brake fluid remains in the accumulator 431.

(Control Embodiment)

A control embodiment of the operation of thus structured vehicle brake device will be explained hereinafter with reference to the flowchart shown in FIG. 3. The brake ECU 6 repeatedly executes the program corresponding to the flowchart every predetermined short time period (control cycle period) when a not illustrated start switch (or an ignition switch) is ON.

Figure 3:
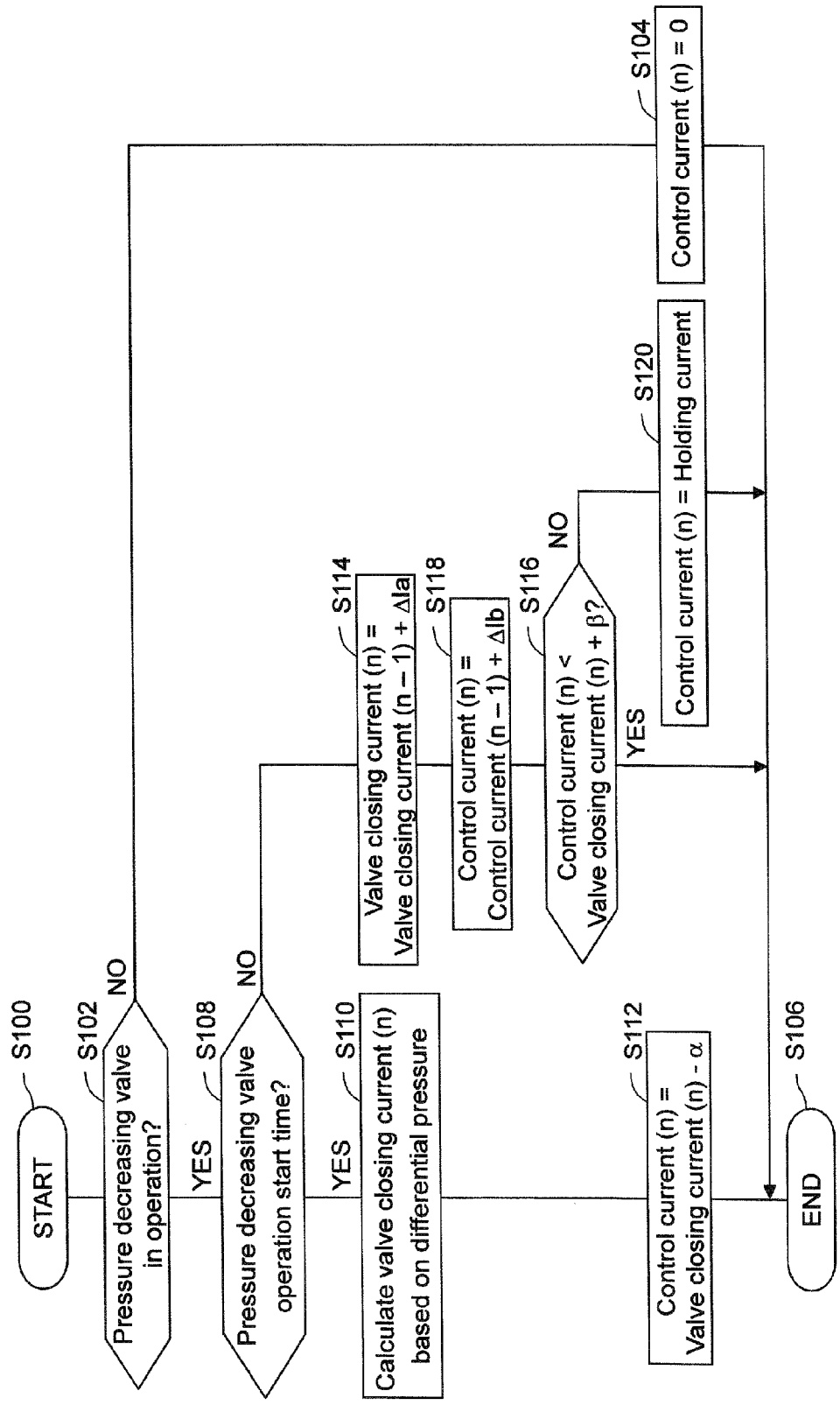
FIG. 3 is a flowchart of control program (control embodiment) to be executed by the brake ECU shown in FIG. 1.

The brake ECU 6 judges whether the pressure decreasing valve 41 is under operation or not at the step S102, every time the execution of the program starts from the step S100 in FIG. 3. More specifically, the brake ECU 6 judges whether an energization instruction signal is outputted to the pressure decreasing valve 41 or not. The brake ECU 6 judges "NO" at the step S102 when the pressure decreasing valve 41 is not under operation (no energization instruction signal is outputted) and advances the program to the step S104. The brake ECU 6 sets the control current applied to the pressure decreasing valve 41 to be zero (0) at the step S104 and thereafter ends the flowchart temporally (step S106). On the other hand, the brake ECU 6 judges "YES" at the step S102 when the pressure decreasing valve 41 is under operation (energization instruction signal is outputted) and advances the program to the step S108. It is noted here that the pressure decreasing valve 41 used here is a normally open type electromagnetic valve, and accordingly, the energization instruction is outputted to the pressure decreasing valve 41 when the valve state is switched over from the open state to the closed state.

The brake ECU 6 judges at the step S108 whether the current time point (this time control cycle) is the operation start time point of the pressure decreasing valve 41 or not. The brake ECU 6 judges "YES" when the current time point is the operation start time point of the pressure decreasing valve 41 and calculates this time valve closing current (n) and sets this time control current (n) based on the valve closing current (n). It is noted that the valve closing current (n) and the control current (n) are the values calculated at this time control cycle and that the values of valve closing current (n−1) and control current (n−1) are calculated at the last time control cycle.

More specifically, at the step S110, the brake ECU 6 calculates the valve closing current (n) based on the differential pressure (including presumed values) between the inlet and outlet ports of the pressure decreasing valve 41. For example, valve closing current at the energization start timing to the pressure decreasing valve 41 is predetermined according to the magnitude of the differential pressure. According to the embodiment, since the outflowing side of the pressure decreasing valve 41 is exposed to the atmospheric pressure through the reservoir 171 and the pressure at the outflowing side is under the atmospheric pressure level and the differential pressure corresponds to the pilot pressure which is the pressure in the first pilot chamber 4D as it is. According to the embodiment, the servo pressure is generated according to the pilot pressure and accordingly, the differential pressure can be calculated based on the actual servo pressure detected by the pressure sensor 74. Further, since the pilot pressure correlates with the target servo pressure (target pressure), i.e., stroke of the brake pedal 10 (pedal stroke), the differential pressure can be calculated by the target servo pressure or the pedal stroke. The valve closing current value is an open/closed state change-over reference current value which is a reference current value necessary for changing over the pressure decreasing valve 41 from the open state to the closed state. The valve closing current value is a value of a current necessary for generating an electromagnetic force in a valve closing direction, balancing with the sum of the elastic force by a spring in the pressure decreasing valve 41 (biasing in a valve opening direction) and a resistance force of the pressure of the fluid. Accordingly, the larger the differential pressure, the larger the resistance force of the pressure of the fluid becomes, and therefore, the larger the valve closing current value becomes.

At the step S112, the brake ECU 6 calculates the start current value which is smaller by a first predetermined value $\alpha$ relative to the valve closing current (n) calculated at the step S110. The first predetermined value $\alpha$ is calculated by the change speed of the differential pressure which will be explained later. The start current value is a current value at the time point where a gradual increase of the control current (second current increase control) starts. The gradual increase of the control current is an increase control of the control current which inclination is smaller than an increase control of the control current (first current increase control) which gives priority to a control responsibility of the pressure decreasing valve 41. The inclination of the first current increase control corresponds to an inclination in a case where the energization of the control current is started as a holding current at the time point that the energization instruction signal is outputted. In other words, the control current is increased to the holding current at the time the energization instruction is outputted.

When the current time point has elapsed the operation start time of the pressure decreasing valve 41, the brake ECU 6 judges "NO" at the step S108 and at the step S114, calculates this time valve closing current (n) based on the last time valve closing current (n−1). The valve closing current is set so that the valve closing current increases at a predetermined inclination (set according to the change speed of the differential pressure) referencing the valve closing current (initial valve closing current) set at the time of start of energization. In other words, the this time valve closing current (n) is calculated by adding a predetermined current $\Delta$Ia which corresponds to the predetermined inclination to the last time valve closing current (n−1). For example, when the differential pressure change speed is zero, the predetermined current $\Delta$Ia is zero and the valve closing current is kept to the initial valve closing current. Then at the step S118, the brake ECU 6 calculates the control current. In other words, the above this time control current (n) is calculated by adding a predetermined current $\Delta$Ib which corresponds to the predetermined inclination to the last time control current (n−1).

Thereafter, the brake ECU 6 judges at the step S116 whether the control current (n) is larger than the finish current value or not, i.e., judges whether the gradual increase of the control current is to be finished or not. It is noted that the finish current value is a current value at which the gradual increase of the control current finishes. This finish current value is set to be the value adding a second predetermined value $\beta$ to the valve closing current (n). The second predetermined value $\beta$ can be any value equal to or more than zero (0), but is preferably set to a value so that the finish current value become larger than the valve closing current.

The gradual increase of the control current starts from the application of the start current value to the pressure decreasing valve 41 at the start point of energization and finishes when the current value becomes the finish current value. The brake ECU 6 judges "YES" at the step S116 from the time the gradual increase of the control current starts until the control finishes and outputs the control current (n) calculated at the step S118.

As a result, the control current increases with a predetermined inclination from the start current value and when the control current exceeds the valve closing current and further exceeds the finish current value, the brake ECU 6 judges "NO" at the step S116 and increases the control current value to the holding current value (step S120). The holding current value is a current value necessary for maintaining the pressure decreasing valve 41 to be in the closed state. The valve closing current is set to be smaller than the holding current value. Similarly, the finish current value is set to be smaller than the holding current value.

(Explanation Based on Time Chart)

Figure 4:
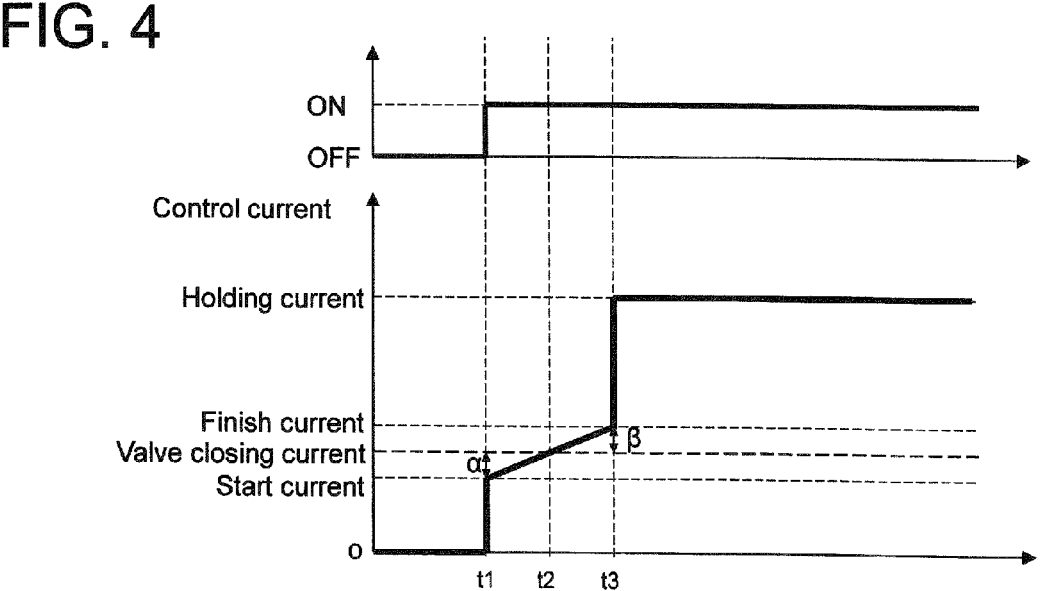
FIG. 4 is a time chart for explaining the operation of the vehicle brake device according to a control embodiment (in case of small differential pressure)

The time chart shown in FIG. 4 will be explained. Upper portion of FIG. 4 indicates the ON/OFF instructions to the pressure decreasing valve 41 and the lower portion of the drawing indicates the control current.

(Small Differential Pressure)

First the case where the differential pressure is small will be explained. When the ON instruction is outputted at the time t1 (start of energization), the gradual increase control of the control current is executed until the time t3. The control current at the time t1, i.e. the start current value is calculated by subtracting the first predetermined value $\alpha$ from the valve closing current (start current value=initial valve closing current value−first predetermined value ($\alpha$)) at the step S112. The valve closing current at the time of start of energization is small corresponding to the small differential pressure (shown with a broken line). The control current increases with a predetermined inclination (corresponding to the inclination $\Delta$Ib) from the time t1 to the time t3 (finish point of the gradual increase of the control current) at the step S118. In this period of time, the pressure decreasing valve 41 becomes the closed state around the time point (t2) where the control current becomes the valve closing current. This can minimize the hammering noise. Further, when the control current increases and the value thereof reaches to the finish current value at the time t3, the gradual increase of the control current finishes. In other words, during the time after the time t3 until the OFF instruction is outputted, the control current is maintained to the holding current (step S120). The finish current value is calculated by adding the second predetermined value $\beta$ to the valve closing current value (step S116).

(Large Differential Pressure)

Figure 5:
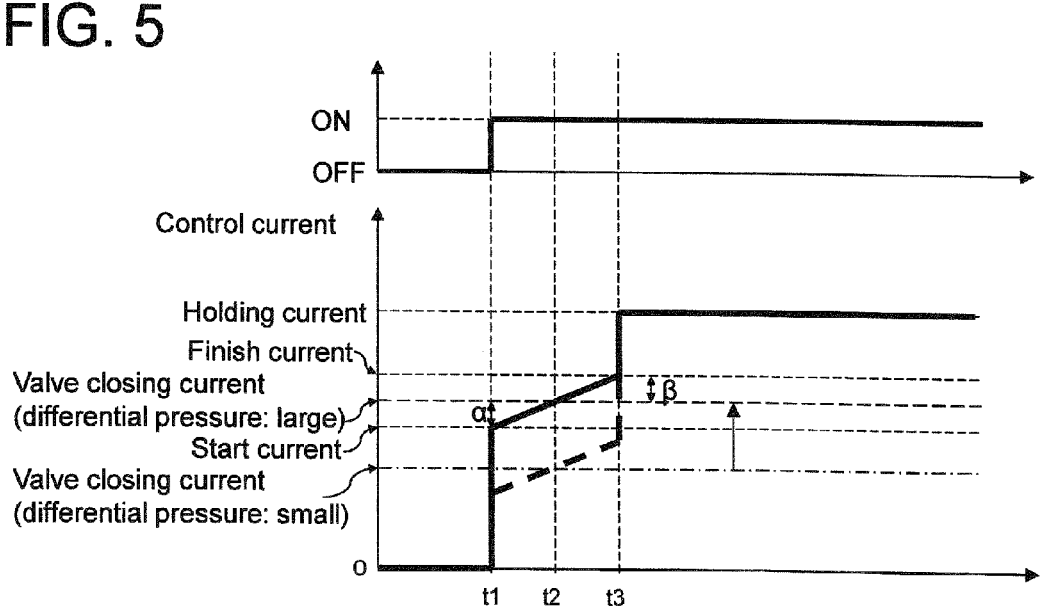
FIG. 5 is a time chart for explaining the operation of the vehicle brake device according to the control embodiment (in case of large differential pressure)

Next, the case where the differential pressure is large will be explained. The valve closing current at the time of energization starts is a large value corresponding to the large differential pressure. As shown in FIG. 5, comparing the case where the differential pressure is small (shown with a dot chain line in FIG. 5), the valve closing current in this case is set to be greater. The difference of this case of large differential pressure from the case of the small differential pressure is that the valve closing current becomes large by the differential pressure difference worth (increasing worth) and the start current value (and finish current value) becomes large by the valve closing current difference worth (increasing worth). The agreeing point with the case of small differential pressure is that the inclination of the gradual increase of the control current is the same.

Accordingly, when the ON instruction is outputted at the time t1 (start of energization), the gradual increase of the control current starts from the value of the start current value larger than the valve closing current of the case of small differential pressure. The control current increases with the predetermined inclination ($\Delta$Ib) from the time t1 to the time t3 (finish point of the gradual increase of the control current) at the step S118. During this time period, the pressure decreasing valve 41 is in the closed state around the time point where the control current becomes the valve closing current (time t2). This can minimize the hammering noise.

In other words, in spite of the increase of the differential pressure, if the valve closing current which is same as the valve closing current under the small differential pressure is adopted, the time point when the control current (shown with a bold broken line in FIG. 5) exceeds the valve closing current becomes the time "t3" when the control current is drastically increasing. Under such state, the hammering noise becomes loud and cannot be suppressed. On the other hand, by controlling the valve closing current at the start of the energization to be the value corresponding to the large differential pressure (step S110), the time point when the control current exceeds the valve closing current becomes the time point "t2" when the control current (shown with a solid line in FIG. 5) is gradually increasing. Under this state, the hammering noise can be minimized.

(When the Change Speed of Differential Pressure is Large: In Case the Valve Closing Current is Changed)

Next, the case where the change speed of the differential pressure is large will be explained. First, the case where the valve closing current is increased with a predetermined inclination will be explained. In this state, at the step S114, the predetermined current $\Delta$Ia is set based on the change speed of the differential pressure. In more specifically, the larger the change speed of the differential pressure is, the larger the predetermined current $\Delta$Ia is set. It is noted here that the change speed of the differential pressure can be calculated based on the actual servo pressure. Further, at the step S118, the predetermined current $\Delta$Ib is net based on the change speed of the differential pressure. In more specifically, the larger the change speed of the differential pressure is, the larger the predetermined current $\Delta$Ib is set.

Figure 6:
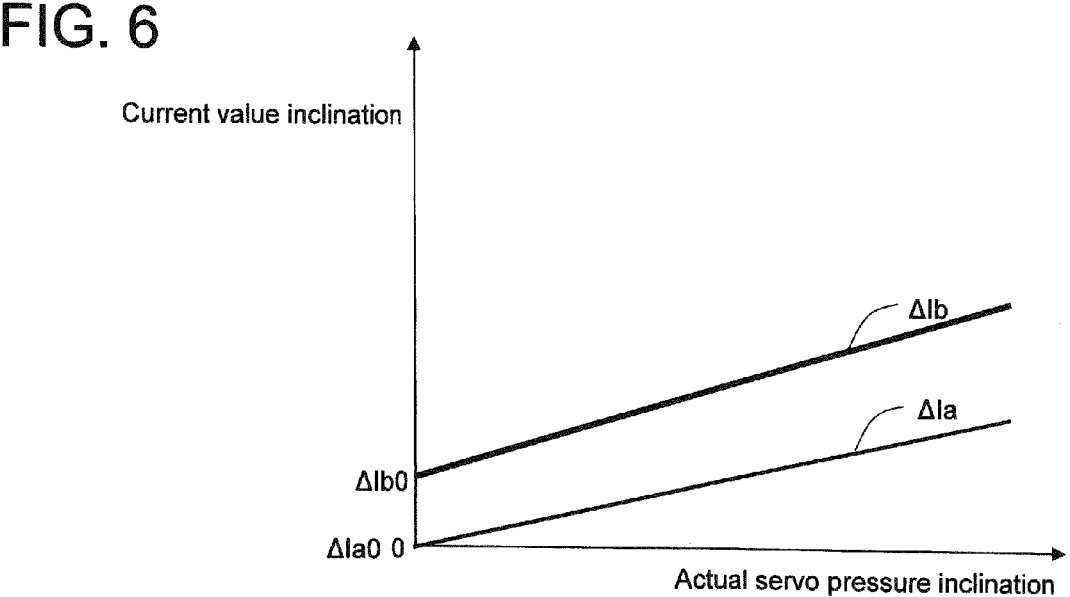
FIG. 6 is a view showing a relationship between the actual servo pressure inclination and the current value inclination.

In this case, the inclination (change speed) of the actual servo pressure is correlated with the inclination (change speed) of the predetermined current $\Delta$Ia as shown in FIG. 6. When the inclination of the actual servo pressure is zero (0), in other words, when the actual servo pressure is constant, the valve closing current also becomes constant. Accordingly, when the inclination of the actual servo pressure is zero, the inclination of the predetermined current $\Delta$Ia is zero as shown by the initial value $\Delta$Ia0 of the predetermined current. The larger the inclination of the actual servo pressure becomes, the larger the inclination of the predetermined current $\Delta$Ia is set. It is noted here that the inclination of the actual servo pressure (change speed) correlates with the inclination of the predetermined current $\Delta$Ib as shown in FIG. 6, as is similar with the relationship between the inclination of the actual servo pressure and the inclination of the predetermined current $\Delta$Ia. It is noted that the value $\Delta$Ib is set relatively larger than the value $\Delta$Ia considering the values $\alpha$ and $\beta$ so that the control current crosses over the valve closing current while the control current is gradually increasing. For example, the inclination of the predetermined current $\Delta$Ia is calculated so that the value $\Delta$Ia changes by a predetermined value ($\alpha$+$\beta$) during a target time period in which the control current increases and the inclination of the predetermined current $\Delta$Ib is set by adding a value to the calculated inclination of the predetermined current $\Delta$Ia. The inclination of the predetermined current $\Delta$Ia when the inclination of the actual servo pressure is zero (0) may be set to a value other than zero (0) considering the possible detection error of the change speed of the actual servo pressure change speed or the like.

Figure 7:
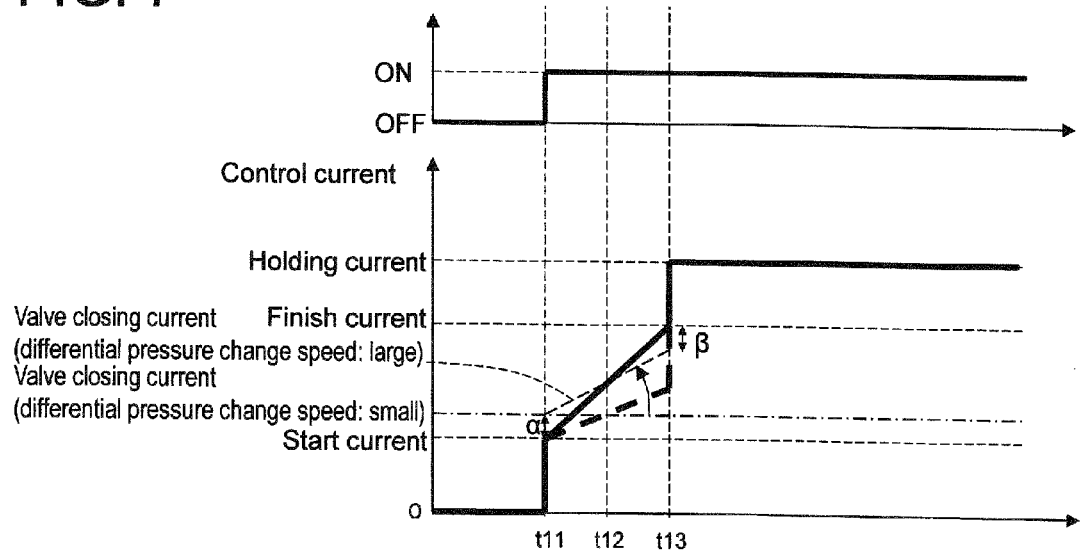
FIG. 7 is a time chart for explaining the operation of the vehicle brake device according to the control embodiment (in case of a large change speed of differential pressure and wherein the valve closing current is changed)

Further explanation will be made with reference to the time chart shown in FIG. 7. The case wherein the differential pressure at the start of energization is small and at the same time the change speed of the differential pressure is large will be explained hereinafter. In this case, the valve closing current at the start of energization is small as explained above and accordingly, the start current value at the start of energization (time "t11") is the same as the case in the small differential pressure as explained above (start current value=valve closing current−$\alpha$), (step S112). The valve closing current is increased with a predetermined inclination (ΔIa) which corresponds to the change speed of the differential pressure from the time "t11" to the time "t13" (the finish time point of gradual increase of the control current) (step S114). Then accompanied by this increase, the finish current value increases based on the inclination (ΔIa). The control current further increases with the predetermined inclination (ΔIb) (step S118). It is noted that the value of the predetermined inclination ΔIb is preferably set to be larger than the predetermined inclination ΔIa. This is why it is necessary for the control current to exceed over the valve closing current.

According, when the ON instruction is outputted at the time point "t11" (start of energization), the gradual increase of control current is started from the start current value under the differential pressure being small. The control current is increased with the predetermined inclination (ΔIb) from the time "t11" to the time "t13" (finish point of gradual increase of the control current) (step S118). During this time, the pressure decreasing valve 41 becomes closed state around the time point when the control current becomes the valve closing current (time "t12"). This can minimize the hammering noise.

In other words, in spite of the increase of the change speed of the differential pressure, if the valve closing current which is same as the valve closing current under the small change speed of the differential pressure is adopted, the time point when the control current (shown with a bold broken line in FIG. 7) exceeds the valve closing current becomes the time "t13" when the control current is drastically increasing. Under such state, the hammering noise becomes relatively large and cannot be suppressed. On the other hand, by controlling the valve closing current under a gradual increase control of the control current to be increasing corresponding to the large change speed of the differential pressure (step S114), the time point when the control current (shown with a bold solid line in FIG. 7) exceeds the valve closing current (shown with a broken line in FIG. 7) becomes the time point "t12" when the control current is gradually increasing. Under this state, the hammering noise can be minimized (When the Change Speed of Differential Pressure is Large: In Case the First Predetermined Value is Changed)

Figure 8:
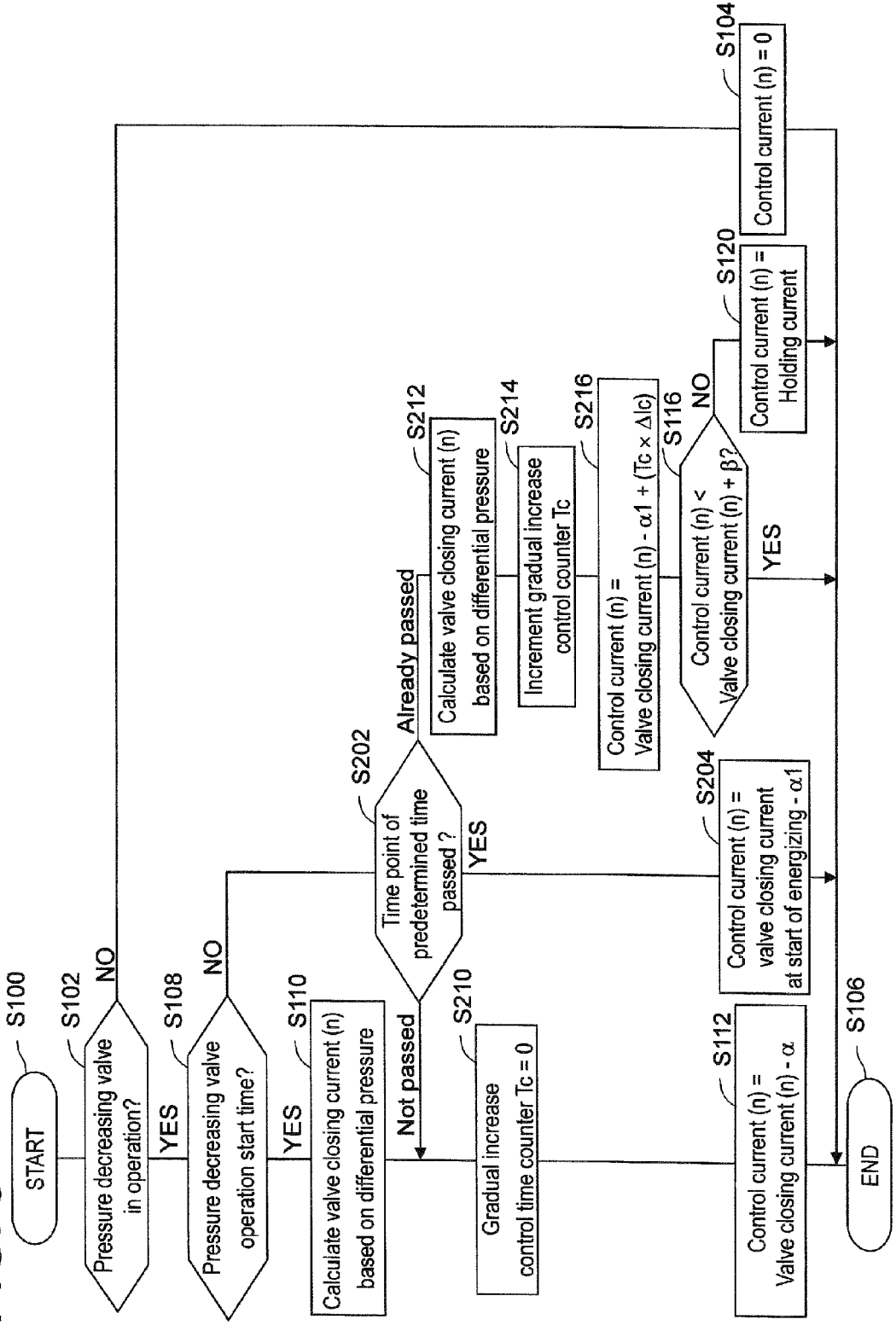
FIG. 8 is a flowchart of control program (another control embodiment) executed by the brake ECU shown in FIG. 1.

Next, the case where the first predetermined value α is reduced will be explained based on the case where the valve closing current is changed as explained above. In this case, as shown in FIG. 8, the processes of the steps S202 and S204 are added to the flowchart shown in FIG. 3. At the step S202, the brake ECU judges whether a predetermined short time has passed or not after the operation start time of the pressure decreasing valve 41 passed. If the current point is the time point when the predetermined short time has passed, the brake ECU 6 judges "YES" at the step S202 and calculates the "this time control current" (n) after the predetermined short time has passed. This time control current (n) is calculated by subtracting the first predetermined value α (in this embodiment "α1") from the valve closing current (the value calculated at the step S110) calculated at the start of the energization (step S204). The first predetermined value α is set based on the change speed of the differential pressure. In more specifically, the larger the change speed of the differential pressure is, the smaller the first predetermined value α is set. The first predetermined value α1 according to this embodiment is a smaller value compared to the value of the case of the small change speed of the differential pressure. It is noted here that the predetermined short time is set to the time period where the change speed of the differential pressure can be detectable (for example set to be the time corresponding to several control cycles). The control current (n) calculated at the step S204 can be set to substantially the start current value for a gradual increase of the control current. If the current point is the time point after the predetermined short time has passed, the brake ECU 6 judges "already passed through" at the step S202 and advances the program to the step S212. Further, if the current time point is the time before the predetermined short time passed, the brake ECU 6 judges "Not passed" at the step S202 and advances the program to the step S210. In the flowchart shown in FIG. 8, this time valve closing voltage (n) is calculated based on the differential pressure at the time of calculation and further, the "this time control current" can be calculated based on the magnitude of this time valve closing voltage (n). Accordingly, even when the valve closing current is changed to the increasing side due to the increase of the differential pressure the control current is also increased according to the increase of the valve closing current and the step S210 is added and instead of the step S118 in FIG. 3, the processes of the steps S212, S214 and S216 are executed. In detail, if at the operation start of the pressure decreasing valve 41, the judgment at the step S108 is "YES", the brake ECU 6 clears the gradual increase control time counter Tc which indicates the time of the gradual increase of the control current to be zero (0) at the step S210. After a predetermined time passed thereafter, at the step S202, the judgment is made to be "already passed" and the gradual increase control of the control current starts. Then, the brake ECU 6 calculates the "this time valve closing current (n)" based on the magnitude of the differential pressure of this time at the step S212. Next, the brake ECU 6 increments the gradual increase control time counter Tc at the step S214 and records the time from the start of the gradual increase of the control current. Then, the brake ECU 6, at the step S216, calculates the "this time control current (n) by subtracting the first predetermined value α1 at the start time of the gradual increase of the control current from the "this time valve closing current (n)" calculated at the step S212 and further adding thereto the value obtained by multiplying the predetermined increase reference inclination ΔIc by the gradual increase control time counter Tc (control current (n)=valve closing current (n)−Δ1+(Tc×Mc). By this calculation, when the gradual increase of the control current is started from the first predetermined value α1, the deviation of the valve closing current and the control current relative to the elapsed time becomes equal. In other words, when the valve closing current increases due to the increase of the differential pressure, the control current also increases by the increased worth of the valve closing current, and the increase speed of the differential pressure becomes large to increase the inclination (change speed) of the valve closing current and then the inclination (change speed) of the control current also increases. In more specifically, the control current changes with an inclination (change speed) calculated by adding a predetermined inclination ΔIc to the valve closing current. The other portions of the flowchart are the same as the flowchart in FIG. 3 and therefore, the operation thereof is the same and explanation thereof is omitted.

Figure 9:
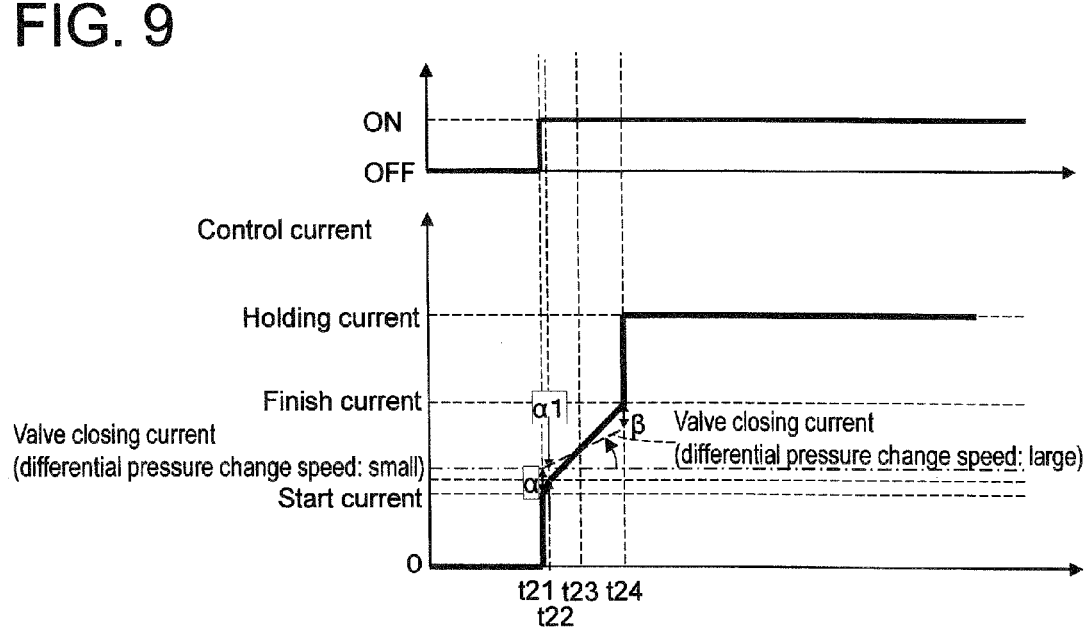
FIG. 9 is a time chart showing the operation of the vehicle brake device according to another control embodiment (in case of the large change speed of differential pressure and wherein the first predetermined value is changed)

Further the operation will be explained with reference to the time chart shown in FIG. 9. The case wherein the differential pressure at the start of energization is small and at the same time the change speed of the differential pressure is large will be explained hereinafter. In this case, the valve closing current at the start of energization is same as the case of the small differential pressure as explained above and accordingly, the start current value at the start of energization (time "t21") is the same as the case in the small differential pressure as explained above (start current value=valve closing current−α), (step S112). The start current value is set to be the control current calculated at the time point passing the predetermined short time (at the time "t22") (control current=valve closing current at the start of energization−first predetermined value α1), considering the larger differential pressure change speed as explained above (step S204). In other words, the start current value is set (changed) to a value close to the valve closing current since the change speed of the differential pressure is large. The valve closing current is increased with an inclination which corresponds to the change speed of the differential pressure from the time "t22" to the time "t24" (the finish time point of gradual increase of the control current) (step S212). Then accompanied by this increase, the finish current value increases with the inclination which corresponds to the change speed of the differential pressure. The control current further increases with a change inclination by adding a predetermined inclination (ΔIc) to the change speed of the valve closing current (step S216).

Accordingly, when the ON instruction is outputted at the time point "t21" (start of energization), the gradual increase of control current is started from the start current value corresponding to the large change speed of the differential pressure (start current value=valve closing current at the start of energization−first predetermined value α1) (time t22). The control current is increased with the predetermined inclination (ΔIc) from the time "t22" to the time "t24" (finish point of gradual increase of the control current) (step S216). During this time, the pressure decreasing valve 41 becomes closed state around the time point (time point 123") when the control current becomes the valve closing current. This can minimize the hammering noise. In other words, the gradual increase of the control current can be started from the state that the start current value is approximated as closer as possible to the valve closing current and accordingly, the control current can exceed the valve closing current at a relatively earlier stage compared to the case where the valve closing current is changed (See FIG. 7). Accordingly, the hammering noise can be minimized in a short time and appropriately even when the change speed of the differential pressure is relatively large, for example, on urgent braking.

As explained above, according to the embodiment of the invention, the brake ECU 6 (vehicle control apparatus) is applied to the vehicle brake device equipped with an electromagnetic control valve (pressure decreasing valve 41) in a hydraulic pressure circuit (servo pressure generating device 4) for controlling the braking force to be applied to the vehicle wherein the vehicle control apparatus gives the control current to the electromagnetic control valve (pressure decreasing valve 41) to open or close thereof. This brake ECU 6 gives a reference current value necessary for changing over an open state of the electromagnetic valve (pressure decreasing valve 41) to a closed state when an energization to the electromagnetic control valve starts and which is a start current value smaller by a first predetermined amount α than an open/closed state change-over reference current value (valve closing current) set based on the differential pressure between the inlet and outlet ports of the electromagnetic control valve (pressure decreasing valve 41) as a control current to the electromagnetic control valve (pressure decreasing valve 41) (step S112) and thereafter executes a gradual increase control of the control current (step S118) and when the control current exceeds a finish current value which is larger than the open/closed state change-over reference current value, finishes the gradual increase control of the control current. The inclination in the gradual increase control of the control current is smaller than an inclination in a increase control of the control current which gives priority to the control responsibility of the electromagnetic control valve (pressure decreasing valve 41).

According to the above feature of the embodiment, since the open/closed state change-over reference current value (valve closing current) is set based on the differential pressure between the inlet and outlet ports of the electromagnetic control valve (pressure decreasing valve 41), even when the differential pressure is changed, the open/closed state change-over reference current value (valve closing current) can be also changed appropriately in accordance with the change of the differential pressure. This can appropriately set the start current value and the finish current value of the control current applying to the electromagnetic control valve (pressure decreasing valve 41). In other words, the state of the electromagnetic valve (pressure decreasing valve 41) is surely changed from the open state to the closed state in the vicinity of the open/closed state change-over reference current value (valve closing current) during the gradual increase control of the control current to the electromagnetic control valve (pressure decreasing valve 41). Thus, the control current appropriately corresponding to the change of the differential pressure can be applied to the electromagnetic control valve (pressure decreasing valve 41). As the result, the open/close operation noise can be reduced without receiving any influence from the change of the differential pressure of the electromagnetic control valve (pressure decreasing valve 41). Further, since the open/closed state change-over reference current value (valve closing current) to the electromagnetic control valve (pressure decreasing valve 41) at the start of energization is set based on the magnitude of the differential pressure between the inlet and outlet ports of the electromagnetic control valve (pressure decreasing valve 41), even when the differential pressure is changed, the open/closed state change-over reference current value (valve closing current) can be also changed appropriately in accordance with the change of the differential pressure. Accordingly, the start current value and the finish current value of the control current to the electromagnetic control valve (pressure decreasing valve 41) can be appropriately set. It is noted that in the embodiment explained above, the invention can be applied to a normally closed electromagnetic valve (such as for example, the pressure increasing valve 42) which is a normally closed type electromagnetic control valve which is in a closed state under non-energized state. In such case, the brake ECU 6 (vehicle control apparatus) is an apparatus which is applied to a vehicle brake device equipped with an electromagnetic control valve (pressure increasing valve 42) provided in a hydraulic pressure circuit (servo pressure generating device 4) for controlling the braking force to be applied to the vehicle wherein the vehicle control apparatus gives the control current to the electromagnetic control valve (pressure increasing valve 42) to open or close thereof. This brake ECU 6 gives a reference current value necessary for changing over a closed state of the electromagnetic valve (pressure increasing valve 42) to an open state when an energization to the electromagnetic control valve starts and which is a start current value smaller by a first predetermined amount α than an open/closed state change-over reference current value (valve opening current) set based on the differential pressure between the inlet and outlet ports of the electromagnetic control valve (pressure increasing valve 42) as a control current to the electromagnetic control valve (pressure increasing valve 42) (step S112) and thereafter executes a gradual increase control of the control current (step S118) with an inclination smaller than an increase control of the control current which gives priority to the control responsibility of the electromagnetic control valve (pressure increasing valve 42) and when the control current exceeds a finish current value which is larger than the open/closed state change-over reference current value, finishes the gradual increase control of the control current. Accordingly, since the open/closed state change-over reference current value (valve opening current) is set based on the magnitude of the differential pressure between the inlet and outlet ports of the electromagnetic control valve (pressure increasing valve 42), even when the differential pressure is changed, the open/closed state change-over reference current value (valve opening current) can be also changed appropriately in accordance with the change of the differential pressure. Accordingly, the start current value and the finish current value of the control current to the electromagnetic control valve (pressure increasing valve 42) can be appropriately set. In other words, the state of the electromagnetic valve (pressure increasing valve 42) is surely changed from the closed state to the open state in the vicinity of the open/closed state change-over reference current value (valve opening current) during the gradual increase control of the control current to the electromagnetic control valve (pressure increasing valve 42). Thus, the control current appropriately corresponding to the change of the differential pressure can be applied to the electromagnetic control valve (pressure increasing valve 42). As the result, the open/close operation noise can be reduced without receiving any influence from the change of the differential pressure of the electromagnetic control valve (pressure increasing valve 42). It is noted here that the valve opening current is set as similar to the valve closing current and is an open/closed state change-over reference current value which is a reference current value necessary for changing over the pressure increasing valve 42 from the closed state to the open state.

Further, the brake ECU 6 (vehicle control apparatus) controls the control current such that the higher the change speed of the differential pressure, the higher the change speed of the control current from the start current value to the finish current value (step S118) becomes. Accordingly, the change speed of the control current from the start current value to the finish current value can be appropriately set in accordance with the change speed of the differential pressure during a gradual increase of the control current to the electromagnetic control valve. Thus, when the electromagnetic control valve is a normally open type electromagnetic valve (pressure decreasing valve 41), the state of the normally open electromagnetic valve is surely changed from the open to the closed state in the vicinity of the open/closed state change-over reference current value during the gradual increase control of the control current to the electromagnetic control valve (pressure decreasing valve 41). On the other hand, when the electromagnetic control valve is a normally closed type electromagnetic valve (pressure increasing valve 42), the state of the normally closed electromagnetic valve (pressure increasing valve 42) is surely changed from the closed to the open state in the vicinity of the open/closed state change-over reference current value during the gradual increase control of the control current to the electromagnetic control valve.

Further, the brake ECU 6 (vehicle control apparatus) changes the first predetermined amount α in response to the change speed of the differential pressure (step S204). Accordingly, the higher the change speed of the differential pressure, the smaller the first predetermined amount α can be set. Thus, the start current value at the start of energization of the electromagnetic control valve can be approximated to the open/closed state change-over reference current value (valve closing current). Accordingly, when the change speed of the differential pressure is large, the normally open type electromagnetic valve (pressure decreasing valve 41) can be quickly and surely changed over from the open state to the closed state in the vicinity of the open/closed state change-over reference current value (valve closing current) during the gradual increase of the control current to the electromagnetic control valve and the normally closed type electromagnetic valve (pressure increasing valve 42) can be quickly and surely changed over from the closed state to the open state in the vicinity of the open/closed state change-over reference current value (valve opening current) during the gradual increase of the control current to the electromagnetic control valve.

Further, the electromagnetic control valve (pressure decreasing valve 41) is a normally open type electromagnetic valve. According to the structure, a normally open type electromagnetic control valve generally generates a hammering noise when the state is changed over from the open state to the closed state upon energization. This hammering noise can be further and effectively minimized.

The vehicle control apparatus includes a master cylinder 1 wherein a master pressure in a master chamber 1D is variable in accordance with a movement of a master piston (for example, the first master piston 14) which is driven to move by a servo pressure in a servo chamber 1A and a servo pressure generating device 4 which includes a high pressure source (high pressure supplying portion 43), a pressure increase control valve (pressure increasing valve 42) provided between the high pressure source 43 and the servo chamber 1A for controlling a flow of brake fluid from the high pressure source 43 to the servo chamber 1A, a low pressure source (reservoir 171) and a pressure decrease control valve (pressure decreasing valve 41) provided between the low pressure source 171 and the servo chamber 1A for controlling the flow of the brake fluid from the servo chamber 1A to the low pressure source 171 thereby to generate the servo pressure in the servo chamber 1A, wherein the electromagnetic control valve is the pressure decrease control valve (pressure decreasing valve 41). A hammering noise may be generated when the pressure decrease control valve (pressure decreasing valve 41) used in the vehicle brake device equipped with the servo pressure generating device 4 is changed over from the open state to the closed state (or from the closed state to the open state). According to the above structure, such noise can be more effectively minimized.

It is noted that the condition that the gradual increase control of the control current finishes can be set to the predetermined time elapsed since the start of the control. In this case, the judgment at the step S116 can be changed to the judgment whether a predetermined time has passed or not from the start of the increase of the control current. This predetermined time can be set to a time when the control current exceeds the valve closing current.

Figure 10:
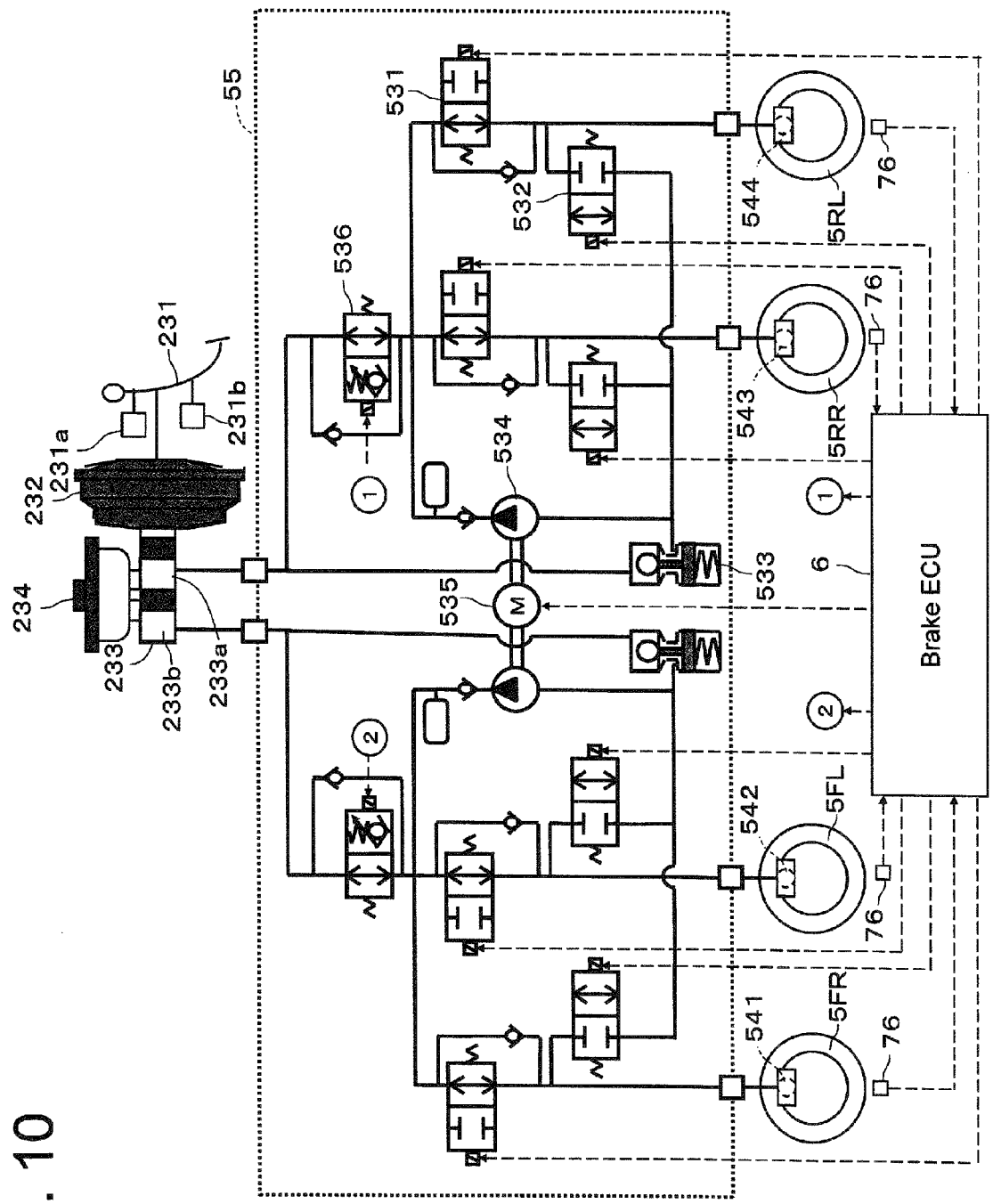
FIG. 10 is a structural view of the vehicle brake device according to another embodiment.

It is noted that the vehicle brake control associated with the embodiment of the invention can be applied to another type vehicle brake device as shown in FIG. 10 equipped with an electromagnetic control valve (differential pressure control valve 536) in a hydraulic pressure circuit 55 for controlling the braking force applied to a vehicle. Difference of the embodiment in FIG. 10 from the embodiment explained above is that the brake booster is of a vacuum type brake booster and that the brake actuator is equipped with a differential pressure control valve.

More specifically, as shown in FIG. 10, the vehicle brake device includes each wheel cylinder 541 through 544, a brake pedal 231 as a brake operating member, a vacuum type brake booster 232, a master cylinder 233, a reservoir tank 234, a brake actuator 55 and a brake ECU 6.

The brake actuator 55 is added with a differential pressure control valve 536 to the brake actuator 53 shown in FIG. 1. The differential pressure control valve 536 is a normally open type linear electromagnetic valve (normally open linear solenoid valve) disposed between the master cylinder 233 and the pressure increasing valve 531. This differential pressure control valve 536 is controlled by the brake ECU 6 to be changed over the state between the communication state (non-differential pressure generated state) and the differential pressure generated state. The differential pressure control valve 536 is normally in communication state under non-energized state, but by energization, the state is changed over to the differential pressure generated state (closing side) to hold a higher pressure in the wheel cylinder 544 side by a predetermined control differential pressure than a hydraulic pressure in the master cylinder 233 side. The pump 534 pumps up the brake fluid in the reservoir 533, i.e., the brake fluid in the master cylinder 233 and supplies the hydraulic circuit between the differential pressure control valve 536 and the pressure increasing valve 531 with the pumped up brake fluid. It is noted that the stop switch 231*a* and the stroke sensor 231*b* are also provided.

According to thus structured vehicle brake device, the brake actuator 55 adjusts the hydraulic pressure in each wheel cylinder 541 through 544 individually and therefore, a well-known anti-skid control, front/rear power distribution control, ESC (electronic stability control) which prevents side slipping (more specifically, under steer preventing control and over steer preventing control), a traction control, inter vehicle distance control, and over-turn preventing control can be performed thereby. Accordingly, the hammering noise can be generated when the state of the electromagnetic control valve (differential pressure control valve 536) is changed over from the open state to the closed state (or from the closed state to the open state) during these control operations. However, such noise generation can be further effectively minimized.

According to the embodiments of the invention, the servo pressure is applied to the back side surface of the first master piston 14. However, the invention is not limited to this structure and as long as the master piston generates the master cylinder hydraulic pressure in response to the servo pressure by slidably moving in the master cylinder 1, such structure is to be within the scope of the invention. Further, the target servo pressure can be set based on the operating force of the brake pedal 10 instead of setting by the operating amount of the brake pedal 10. In this case, a sensor for detecting the operating force may be provided.

Obviously, numerous modifications and variations of the present invention are possible in light of the above teachings. It is therefore to be understood that within the scope of the appended claims, the present invention may be practiced otherwise than as specifically described herein.

The invention claimed is:

1. A vehicle control apparatus applied to a vehicle brake device equipped with an electromagnetic control valve provided in a hydraulic pressure circuit for controlling a braking force to be applied to a vehicle, the vehicle control apparatus including a brake ECU applying control current to make the electromagnetic control valve open or close, the electromagnetic control valve being either a normally open electromagnetic valve which becomes an open state when de-energized or a normally closed electromagnetic valve which becomes a closed state when de-energized, the brake ECU being configured to:

calculate, based on a magnitude of a differential pressure between an inlet port and an outlet port of the electromagnetic control valve, an open/closed state change-over reference current value which is necessary for changing over a state of the normally open electromagnetic valve from the open state to a closed state or for changing over a state of the normally closed electromagnetic valve from the closed state to an open state, calculate a start current value which is smaller than the open/closed state change-over reference current value by a predetermined amount, increase the control current first to the start current value at a start of energization of the electromagnetic control valve, thereafter, execute a gradual increase control of the control current with a predetermined inclination which is smaller than an increase inclination of an increase control of the control current which gives priority to a control responsibility of the electromagnetic control valve, and is set based on a change speed of the differential pressure between the inlet and outlet ports of the electromagnetic control valve, and finish the gradual increase control of the control current when the control current exceeds a finish current value which is larger than the open/closed state change-over reference current value.

2. The vehicle control apparatus according to claim 1, wherein the brake ECU controls the control current so that a change speed of the control current from the start current value to the finish current value becomes high as a change speed of the differential pressure becomes high.

3. The vehicle control apparatus according to claim 1, wherein the brake ECU changes the predetermined amount in accordance with the change speed of the differential pressure.

4. The vehicle brake control apparatus according to claim 1, wherein the vehicle brake device further includes a master cylinder wherein a master pressure in a master chamber is variable in accordance with a movement of a master piston which is driven to move by a servo pressure in a servo chamber and a servo pressure generating device which includes a high pressure source, a pressure increase control valve provided between the high pressure source and the servo chamber for controlling a flow of brake fluid from the high pressure source to the servo chamber, a low pressure source and a pressure decrease control valve provided between the low pressure source and the servo chamber for controlling the flow of the brake fluid from the servo chamber to the low pressure source thereby to generate the servo pressure in the servo chamber, and wherein the electromagnetic control valve is the pressure decrease control valve.

5. The vehicle brake control apparatus according to claim 2, wherein the vehicle brake device further includes a master cylinder wherein a master pressure in a master chamber is variable in accordance with a movement of a master piston which is driven to move by a servo pressure in a servo chamber and a servo pressure generating device which includes a high pressure source, a pressure increase control valve provided between the high pressure source and the servo chamber for controlling a flow of brake fluid from the high pressure source to the servo chamber, a low pressure source and a pressure decrease control valve provided between the low pressure source and the servo chamber for controlling the flow of the brake fluid from the servo chamber to the low pressure source thereby to generate the servo pressure in the servo chamber, and wherein the electromagnetic control valve is the pressure decrease control valve.

6. The vehicle brake control apparatus according to claim 3, wherein the vehicle brake device further includes a master cylinder wherein a master pressure in a master chamber is variable in accordance with a movement of a master piston which is driven to move by a servo pressure in a servo chamber and a servo pressure generating device which includes a high pressure source, a pressure increase control valve provided between the high pressure source and the servo chamber for controlling a flow of brake fluid from the high pressure source to the servo chamber, a low pressure source and a pressure decrease control valve provided between the low pressure source and the servo chamber for controlling the flow of the brake fluid from the servo chamber to the low pressure source thereby to generate the servo pressure in the servo chamber, and wherein the electromagnetic control valve is the pressure decrease control valve.

7. The vehicle control apparatus according to claim 2, wherein
the brake ECU controls the control current to increase gradually so that the change speed of the control current from the start current value to the finish current value is higher than a change of speed of the open/closed state change-over reference current value based on the change speed of the differential pressure.

8. The vehicle control apparatus according to claim 3, wherein
the brake ECU calculates the predetermined amount such that the larger the change speed of the differential pressure between the inlet and outlet ports of the electromagnetic control valve is, the smaller the predetermined amount is.

* * * * *